Dec. 27, 1955   R. DJIDICH   2,728,579
COLLET CHUCK
Filed Oct. 13, 1953

INVENTOR:
ROBERT DJIDICH
BY
ATT'YS

United States Patent Office 2,728,579
Patented Dec. 27, 1955

2,728,579
COLLET CHUCK
Robert Djidich, Chicago, Ill.

Application October 13, 1953, Serial No. 385,734

9 Claims. (Cl. 279—43)

This invention relates to improvements in collet chucks for holding screw machine piece parts, implements for machine-tool operations, and shanks of drills.

The main objects of this invention are to provide an improved form of collet chuck mechanism for the metal-working industry that is compact and accurate and especially adaptable for use on rotary indexing tables and for other machine-tool operations when a reduction in overall height of the chuck is desirable; to provide an improved construction for such mechanism that is especially adapted to utilize collets of a common form that are available wherever automatic screw machines are operated; to provide an improved form of collet actuating mechanism of this type that readily compensates its shank-gripping action so that small irregularities in the size of the shank parts being held in the collet will not affect the security of the grip of the collet thereon and will not cause injury to the mechanism when such pieces are over size; to provide such mechanism that will accurately hold work pieces in true axial alignment with the collet regardless of small irregularities in the shank size of said work; to provide a mechanism of this type that is extremely simple, involving few parts in an assembly that can be easily separated and reassembled for cleaning purposes, and the operation of which will not be greatly affected by chips from metal-cutting operations; to provide an improved mechanism of this kind wherein the opening and closing of the collet jaws are accomplished by a simple movement of an actuator from one limit to another and without requiring the exertion of an undue amount of effort on the part of the operator; to provide an improved collet-holding and actuating mechanism of such form that the replacement of collet or change from one size of collet to another can be accomplished in a minimum period of time; and to provide a collet-actuating mechanism of such form as to be subject to a minimum amount of wear during long usage and wherein any wear that might occur will not detract from the accuracy and proper operation of the mechanism.

A specific embodiment of this invention is shown in the accompanying drawings in which.

Figure 1:
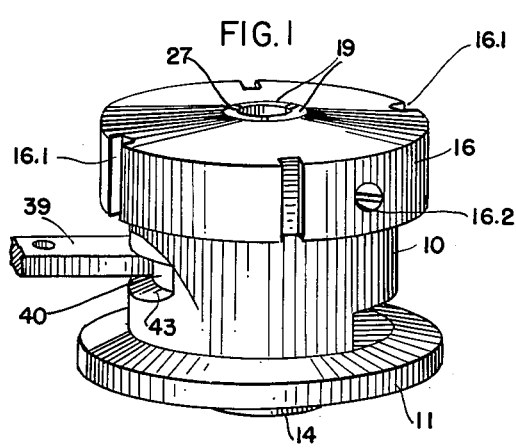
Figure 1 is a perspective view of a collet chuck constructed according to this invention.

In the form shown in the drawings, the housing 10, or body of the chuck, is of cylindrical shape with a base flange 11 drilled at 12 and 13 for screws and dowels, whereby it may be mounted upon a platform or base (not shown), which is counterbored to accommodate the axial boss 14 that projects below the flange 11. The upper end of the body 10 is externally threaded at 15 to receive a cap 16, which may be provided with spanner slots 16.1 and set screw 16.2.

The collet 17 is of a well known tubular form split in the usual fashion by longitudinal slots 18 extending inward from its front end, which is at the top in the drawings, to provide a plurality of radially movable jaws 19—usually three in number—adapted for gripping a cylindrical shank of a tool or work piece. The collet has a conically tapered enlargement or head 20 adjacent the front end of the jaws which coacts with a conical seat 21 on a coacting wedge member 22 which will be hereinafter described. The collet also has an integrally formed cylindrical collar 23 at its rear end whereby it is guided in the bore 24 of the boss 14 at the bottom of the housing 10. In the form shown, the head 20 has an annular shoulder 25 that abuts against the inner top surface 26 of the cap 16 and the front ends of the jaws 19 extend through a central aperture 27 in the cap.

The housing, comprising the body 10 and the cap 16, is of substantially the same length as the collet 17 and has a bore of stepped formation to accommodate the mechanism for opening and closing the jaws of the collet. In the region of the base flange 11 and boss 14, the rear portion 24 of the bore is of a diameter substantially the same as that of the collar 23 on the collet, and the diameter of the sleeve 22 is substantially the same as the diameter of the counterbore 35 to insure extreme accuracy of fit in the bores.

The counterbore 28 is internally threaded to receive an externally threaded sleeve 29 which serves as an adjustable abutment, coacting with the front sleeve 22 and the interposed actuating mechanism which closes the jaws of the collet 17. For the purpose of adjusting the abutment sleeve 29, this sleeve is provided with pin holes 30 in its periphery which are accessible through a slot 31 formed in the wall of the body 10. The abutment sleeve 29 has a ball race 32 in which are seated a series of bearing balls 33 held together for handling as a unit by a suitable retainer ring 34.

The front end of the housing has a counterbore 35 of larger diameter than the counterbore 28 which slidably fits the external periphery of the sleeve 22. A stud 36 fixed in the wall of the body 10 extends into a longitudinal groove 37 in the periphery of the sleeve 22 so as to prevent rotation of said sleeve without interfering with its longitudinal or axial movement along the collet.

Interposed between the abutment sleeve 29 and the wedge member 22 is an actuating member 38 in the form of a disc with a circular periphery loosely fitting within the counterbore 35 and an operating arm 39 which extends through a slot 40 in the side wall of the housing body 10. This slot 40 is of suitable angular width to allow for the necessary angular movement of the operating arm 39 for operation of the collet-actuating mechanism, as will hereinafter appear.

The actuating member 38 is bored centrally to accommodate the collet and has a concentric series of ball bearing sockets 41 of suitable diameter to fit bearing rollers or balls 42 whose diameter is sufficient to extend both above and below the surfaces of the actuating disc 38. The ball sockets 41 are of smaller diameter at their lower ends than those of the balls 42 so that said balls are retained by the disc 38.

Figure 3:
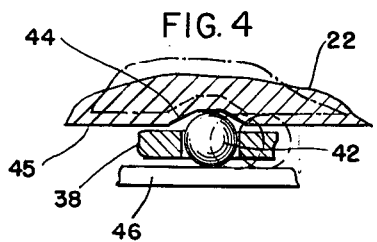
Fig. 3 is a sectional detail of the chuck taken through the longitudinal axis of the collet.
Figure 4:
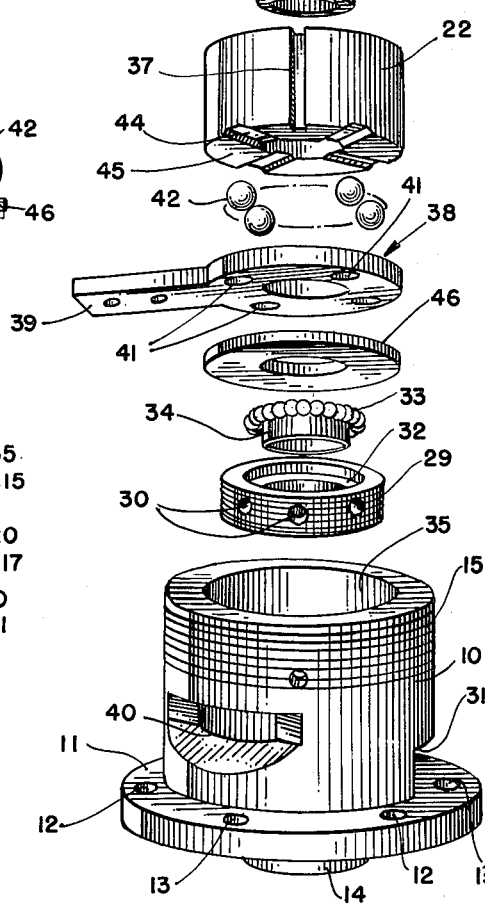
Fig. 4 is a diagrammatic detail of the cam mechanism that controls the opening and closing of the collet.

The bottom surface 43 of the slot 40 is slanted, as shown in Fig. 3, for the free passage of the arm 39 when said actuating member is dropped into place in the housing.

Radial grooves 44 are cut in the bottom or rear end of the member 22, in locations corresponding to the spaced positions of the balls 42 in the actuator member 38, to provide cam surfaces that coact with the balls 42 to shift the member 22 for opening and closing the jaws of the collet.

It will be understood that when the lever 39 is at one end of its throw in an angular direction about the axis of the collet, the balls 42 will rest in the socket grooves 44 and the member 22 will accordingly allow the collet to assume its open position; and when the arm 39 is shifted to the opposite limit of its angular movement, the balls 42 will cam the member 22 into position for closing the jaws of the collet. The balls 42 will then bear against the high surfaces 45 between the grooves 44 and securely hold the collet with its jaws compressed.

The pressure of the jaws of the collet against the work piece is regulated by a spring plate 46 in the form of a resilient washer that is interposed between the balls carried by the actuating member 38 and the balls of the abutment member 29.

Figure 2:
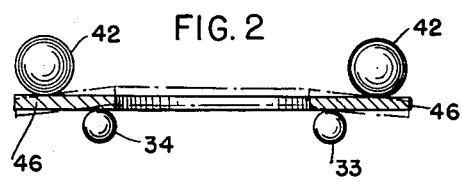
Fig. 2 is an enlarged sectional detail illustrating the structure and operation of the spring that controls the pressure of the collet jaws upon the work or tool shank that is to be gripped thereby.

These concentric sets of bearing balls are spaced at different radial distances from the axis of the collet so that when the jaws of the collet are closed, the normally flat spring washer will be sprung to dish form (as shown in Fig. 2). Thus the gripping power of the collet upon the machine part or tool shank is not affected by minor irregularities in the diameter of the part. Adjustment of this spring pressure can be accomplished by rotating the abutment member 29 in its threaded relation with the housing 10, and it may be locked in position by the set screw 30.1.

Figure 5:
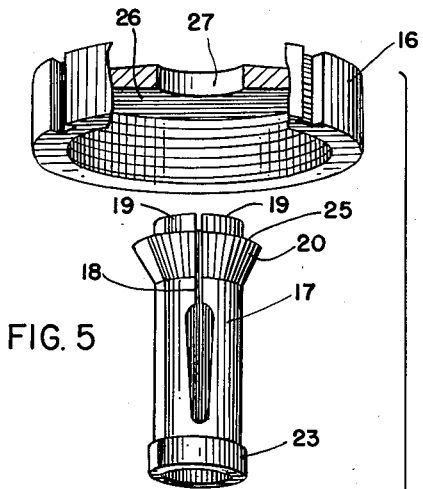
Fig. 5 is an exploded perspective view showing the structure and the relation of the individual parts of the chuck, the front of the cap of the housing being partly broken away.

To assemble the chuck, the parts are inserted into the housing 10 in the order in which they are shown in vertical progression in Figure 5. The abutment member 29 is first inserted into the housing and screwed down to the bottom of its bore in the housing with the balls 33 and their retainer 34 in place thereon. The spring washer 46 is then dropped into the housing and is properly centered over the ball bearing 33 because its periphery fits loosely within the counterbore 35 of the housing. The balls 42 are placed in position in the actuator disc 37 and together with that disc are dropped into place over the spring washer 46. In this operation the arm 39 is tilted downward and pushed through the slot 40, whereupon the member 38 will fall into position under the guidance of the walls of the counterbore 35 until it rests horizontally on the spring washer 46. The sleeve member 22 is next dropped into place in the housing. All of the members 22, 38, 46 and 29 have internal bores large enough to permit the collet 17 to be dropped through them, as indicated in Fig. 3, and finally the cap 16 is screwed down upon the body 10 of the housing and locked by set screw 16.2.

In operation the jaws of the collet are urged to their open position by the resilient structure of the collet and the shoulder 25 of the collet normally abuts against the cover, as shown in Fig. 3.

When the arm 39 is in one limit of its movement, the balls 42 will rest in the grooves 44 and the sleeve member 22 will return by the normal tendency of the collet jaws to expand to their open position.

When the arm 39 is shifted to the opposite limit of its angular movement, the balls 42 will pass out of the grooves 44 and cam the sleeve 22 upward so as to wedge the jaws of the collet to their closed position. It is now obvious that the sleeve 22 will not rotate because of the stud 36 in groove 37 but will only shift axially. The wedging force is controlled by the spring washer 46. Adjustment for regulating the pressure of the collet jaws upon the work piece can be accomplished when desired by adjustment of the abutment member 29. When the actuator is rotated, the balls 42 and 33 rotate, causing the spring washer 46 to rotate in the same direction but twice as far. This makes it very easy to open and close the collet.

To clean the mechanism of accumulated chips, it is only necessary to remove the cap 16, the collet 17 and the sleeve 22, whereupon the mechanism can be flushed completely. It is to be especially noted, however, that the length of the chuck is relatively short and the axial bore in the collet is large so that chips will readily pass therethrough and out of the rear end, whereby cleaning the chuck of chips is rarely required.

Although but one specific embodiment of this invention is herein shown and described, it will be understood that numerous details of the construction shown may be altered or omitted without departing from the spirit of the invention as defined by the following claims.

I claim:

1. A collet chuck comprising a collet having jaws, a housing therefor, a wedge member slidable in said housing along said collet for closing the jaws thereof, an abutment member spaced behind said wedge member, actuating means interposed between said members and angularly rotatable about the axis of said collet, cam means acting between said actuating means and one of said members for shifting said wedge member along said collet, and a spring interposed between said actuating means and the other said member to regulate the pressure transmitted from said cam means to said wedge member.

2. A collet chuck comprising a collet having jaws, a housing therefor, a wedge member slidable in said housing along said collet for closing the jaws thereof, an abutment member spaced behind said wedge member, actuating means interposed between said members and angularly rotatable about the axis of said collet, cam means acting between said actuating means and said wedge member for shifting said wedge member along said collet, and a spring interposed between said actuating means and said abutment member to regulate the pressure transmitted from said cam means to said wedge member.

3. A collet chuck comprising a collet having jaws, a wedge member axially slidable along said collet for closing the jaws thereof, an abutment member spaced behind said wedge member, a spring plate interposed between said members, a pair of annular roller bearings located concentrically of the axis of said collet, said bearings being of respectively different diameters, one being interposed between said plate and said wedge member and the other being interposed between said plate and said abutment member, cam means coacting with one of said bearings for shifting said wedge member through the rotation of said one bearing, and actuating means for rotating said one bearing in relation to said cam means, said spring plate being adapted to be buckled by the pressure thereon of said bearings to regulate the pressure transmitted by said cam means to said wedge member.

4. A collet chuck comprising a collet having jaws, a wedge member axially slidable along said collet for closing the jaws thereof, an abutment member spaced behind said wedge member, a spring washer interposed between said members, a pair of annular roller bearings located concentrically with the axis of said collet, said bearings being of respectively different diameters, one being interposed between said washer and said wedge member and the other being interposed between said washer and said abutment member, cam means coacting with one of said bearings for shifting said wedge member through the rotation of said one bearing, and actuating means for rotating said one bearing in relation to said cam means, said spring washer being adapted to be buckled by the pressure thereon of said bearings to regulate the pressure transmitted by said cam means to said wedge member.

5. A collet chuck comprising a collet having jaws, a housing therefor, an annular wedge member slidable in said housing along said collet for closing the jaws thereof, an abutment member spaced behind said wedge member, a spring washer interposed between said members, an annular ball bearing concentric with said collet interposed between said wedge member and said washer, a second annular ball bearing of different diameter from said first-named ball bearing and interposed between said washer and said abutment member, said wedge member having cam formations coacting with the balls of said first-named ball bearing to control the movements of said wedge member, and an actuating member adapted to shift said first-named ball bearing angularly about the axis of said collet.

6. A collet chuck comprising a collet having jaws, a housing therefor, an annular wedge member slidable in said housing along said collet for closing the jaws thereof, an abutment member spaced behind said wedge member, a spring washer interposed between said members, an annular ball bearing concentric with said collet and interposed between said wedge member and said washer, a second annular ball bearing of different diameter from said first-named ball bearing and interposed between said washer and said abutment member, said wedge member having cam formations coacting with the balls of said first-named ball bearing to control the movements of said wedge member, and an actuating member adapted to shift said first-named ball bearing angularly about the axis of said collet, said washer being adapted to be buckled by the pressure of said bearings thereon to regulate the pressure transmitted from said cam formations to said wedge member, and said abutment member being adjustable in said housing to vary the resultant tension produced by said washer.

7. A collet chuck comprising a collet having jaws, a housing therefor, an annular wedge member slidable in said housing along said collet for closing the jaws thereof, an annular abutment member spaced behind said wedge member, an annular spring washer interposed between said members, an annular ball bearing concentric with said collet and interposed between said wedge member and the outer marginal part of said washer, a second annular ball bearing of smaller diameter from said first-named ball bearing and interposed between the inner marginal part of said washer and said abutment member, said wedge member having cam formations coacting with the balls of said first-named ball bearing to control the movements of said wedge member and an actuating member adapted to shift said first-named ball bearing angularly about the axis of said collet, said washer being adapted to be buckled conically by the pressure of said bearings thereon to regulate the pressure transmitted from said cam formations to said wedge member, and said abutment member being adjustable in said housing to vary the resultant tension produced by said washer.

8. A collet chuck comprising a collet having jaws, a housing therefor, an annular wedge member slidable in said housing along said collet for closing the jaws thereof, an abutment member spaced behind said wedge member, a spring washer interposed between said members, an annular ball bearing concentric with said collet and interposed between said wedge member and said washer and comprising a series of balls spaced apart at definite angular intervals, a second annular ball bearing of different diameter from said first-named ball bearing and interposed between said washer and said abutment member, said wedge member having cam formations comprising radial grooves angularly spaced to coact with the balls of said first-named ball bearing to control the movements of said wedge member, and an actuating member serving as a ball retainer adapted to shift said first-named ball bearing angularly about the axis of said collet, said washer being adapted to be buckled by the pressure of said bearings thereon to regulate the pressure transmitted from said cam formations to said wedge member, and said abutment member being adjustable in said housing to vary the resultant tension produced by said washer.

9. The device according to claim 8 wherein the individual balls of said second mentioned ball bearing are substantially smaller in diameter than the individual balls of said first mentioned ball bearing and said second mentioned ball bearing is smaller in diameter than the diameter of said first mentioned ball bearing, and is positioned closer to the main axis of the device than said first mentioned ball bearing.

References Cited in the file of this patent

UNITED STATES PATENTS

| | | |
|---|---|---|
| 2,655,826 | Goldsby | Oct. 20, 1953 |

FOREIGN PATENTS

| | | |
|---|---|---|
| 552,905 | Great Britain | Apr. 29, 1943 |
| 587,871 | Great Britain | May 7, 1947 |